United States Patent [19]

Erbes

[11] Patent Number: 5,538,381
[45] Date of Patent: Jul. 23, 1996

[54] MECHANISM FOR COUPLING A MEMBER TO A CIRCULAR HOLE IN A METAL PLATE

[75] Inventor: John G. Erbes, Mt. View, Calif.

[73] Assignee: General Electric Company, San Jose, Calif.

[21] Appl. No.: 260,589

[22] Filed: Jun. 16, 1994

[51] Int. Cl.$^6$ .............................. F16B 19/00; F16B 13/06
[52] U.S. Cl. .............................. 411/509; 411/60; 411/913
[58] Field of Search .................................. 411/41, 45, 48, 411/57, 60, 61, 508, 509, 913

[56] References Cited

U.S. PATENT DOCUMENTS

| | | | |
|---|---|---|---|
| 1,366,955 | 2/1921 | Schneible. | |
| 1,425,712 | 8/1922 | Stockford. | |
| 3,445,971 | 5/1969 | Desmarchais | 52/80 |
| 3,449,799 | 6/1969 | Bien | 411/913 X |
| 3,733,760 | 5/1973 | Koerner | 52/224 |
| 3,734,827 | 5/1973 | Schilling | 176/87 |
| 3,744,660 | 7/1973 | Gaines | 220/10 |
| 3,785,924 | 1/1974 | Notari | 176/61 |
| 3,803,670 | 4/1974 | Johnson | 411/508 |
| 3,910,447 | 10/1975 | Bevilacqua | 220/3 |
| 3,963,565 | 6/1976 | Beine | 176/38 |
| 4,047,632 | 9/1977 | Schilling | 220/3 |
| 4,262,402 | 4/1981 | Cooper | 29/157.4 |
| 4,322,880 | 4/1982 | Lampe | 29/452 |
| 4,409,179 | 10/1983 | Burger | 376/302 |
| 4,537,542 | 8/1985 | Pratt et al. | 411/45 X |
| 4,818,470 | 4/1989 | Richardson | 376/245 |
| 4,965,915 | 10/1990 | Steininger | 411/508 X |
| 5,135,341 | 8/1992 | Leyder | 411/508 X |
| 5,240,361 | 8/1993 | Armstrong et al. | 411/60 X |
| 5,342,322 | 2/1995 | Whitling | 376/260 |
| 5,402,570 | 4/1995 | Weems et al. | 29/890.031 |

FOREIGN PATENT DOCUMENTS

| | | | |
|---|---|---|---|
| 2051780 | 4/1971 | France. | |
| 2024630 | 1/1971 | Germany. | |
| 2361416 | 4/1975 | Germany. | |
| 249468 | 4/1948 | Sweden | 411/60 |
| 1271594 | 4/1972 | United Kingdom. | |
| 94/03903 | 2/1994 | WIPO. | |

OTHER PUBLICATIONS

GE Proposal No. 894–ID7DM–EK1, Revision 1, Core Sprayer Line Crack Repair, Dec. 9, 1993.
Shroud Repair, Description of Alternatives, Alan N. Baker, Mar. 1994.
Apr. 22, 1994 letter from Al Kozusko & Thomas Sliva of AEA O'Donnell, Inc. to Victor Bain of General Electric Company with annexed Description, facsimile cover sheet and drawings.
Presentation No. 94–004 dated May 2, 1994, by Welding Services Inc. and Structural Integrity Associates, Inc.
GE Internal Memo from Irvin Kobsa to Charles Dillmann dated Mar. 21, 1994, with annexed drawing and calculations.
Big Rock Point Nuclear Plant Thermal Shield Instability: Part I, Redesign and Test Programs, J. E. Corr, APED–5178, Class II, May 1966.
Big Rock Point Nuclear Plant Thermal Shield Instability: Part 2, Analysis, J. E. Corr, NEDO–13010, 69 NED–33, Class I, Nov. 1969.
Report of Operation of Big Rock Point Nuclear Plant, License No. DPR–6, Docket No. 50–155, Consumers Power Co.

(List continued on next page.)

*Primary Examiner*—Neill R. Wilson
*Attorney, Agent, or Firm*—James E. McGinness

[57] ABSTRACT

A method and an apparatus for restraining a cracked shroud against vertical joint separation. The method involves the placement of a plurality of tie rods (e.g., four) in the downcomer annulus at respective azimuthal positions, each of the tie rods having one end anchored to the shroud support plate. The other end of each tie rod is latched over the top edge of the shroud to counteract lifting forces exerted on the shroud by the bolts which hold down the shroud head.

12 Claims, 5 Drawing Sheets

OTHER PUBLICATIONS

Yankee Atomic Electric Company, Proposed Change No. 70, Letter to U.S. Atomic Energy Commission, Oct. 15, 1965.

U.S. Atomic Energy Commission, Safety Evaluation of Proposed Change No. 70, Oct. 28, 1965.

Yankee Atomic Electric Company, Proposed Change No. 68, Letter to U.S. Atomic Energy Commission, Oct. 15, 1965.

U.S. Atomic Energy Commission, Safety Evaluation of Proposed Change No. 68, Oct. 28, 1965.

"Applicability of Pipelocks as a Remedy for IGSCC in BWRs", Abel et al., Int. J. Pres. Ves. & Piping, 25, pp. 25–46 (1986).

BWR Owner's Group, BWROG–91028, Apr. 1991, Recommendations on Inservice Inspection of BWR Internal Components & Attachments.

MECHANISM FOR COUPLING A MEMBER TO A CIRCULAR HOLE IN A METAL PLATE

FIELD OF THE INVENTION

This invention relates to techniques for maintaining a nuclear reactor in a safe condition in the event of an accident that could potentially cause damage to the nuclear fuel core. In particular, the invention relates to techniques for stabilizing the core shroud of a nuclear reactor in the event of a loss-of-coolant accident or seismic disturbance.

BACKGROUND OF THE INVENTION

A conventional boiling water reactor is shown in FIG. 1. Feedwater is admitted into a reactor pressure vessel (RPV) 10 via a feedwater inlet 12 and a feedwater sparger 14, which is a ring-shaped pipe having suitable apertures for circumferentially distributing the feedwater inside the RPV. A core spray inlet 11 supplies water to a core spray sparger 15 via core spray line 13. The feedwater from feedwater sparger 14 flows downwardly through the downcomer annulus 16, which is an annular region between RPV 10 and core shroud 18. Core shroud 18 is a stainless steel cylinder surrounding the core 20, which is made up of a plurality of fuel bundle assemblies 22 (only two 2×2 arrays of which are shown in FIG. 1). Each array of fuel bundle assemblies is supported at the top by a top guide 19 and at the bottom by a core plate 21. The core top guide provides lateral support for the top of the fuel assemblies and maintains the correct fuel channel spacing to permit control rod insertion.

The water flows through downcomer annulus 16 to the core lower plenum 24. The water subsequently enters the fuel assemblies 22, wherein a boiling boundary layer is established. A mixture of water and steam enters core upper plenum 26 under shroud head 28. Core upper plenum 26 provides standoff between the steam-water mixture exiting core 20 and entering vertical standpipes 30. The standpipes are disposed atop shroud head 28 and in fluid communication with core upper plenum 26.

The steam-water mixture flows through standpipes 30 and enters steam separators 32, which are of the axial-flow centrifugal type. The separated liquid water then mixes with feedwater in the mixing plenum 33, which mixture then returns to the core via the downcomer annulus. The steam passes through steam dryers 34 and enters steam dome 36. The steam is withdrawn from the RPV via steam outlet 38.

The BWR also includes a coolant recirculation system which provides the forced convection flow through the core necessary to attain the required power density. A portion of the water is sucked from the lower end of the downcomer annulus 16 via recirculation water outlet 43 and forced by a centrifugal recirculation pump (not shown) into jet pump assemblies 42 (only one of which is shown) via recirculation water inlets 45. The BWR has two recirculation pumps, each of which provides the driving flow for a plurality of jet pump assemblies. The pressurized driving water is supplied to each jet pump nozzle 44 via an inlet riser 47, an elbow 48 and an inlet mixer 46 in flow sequence. A typical BWR has 16 to 24 inlet mixers. The jet pump assemblies are circumferentially distributed around the core shroud 18.

The core shroud 18 (see FIG. 2) comprises a shroud head flange 18a for supporting the shroud head 28; a circular cylindrical upper shroud wall 18b having a top end welded to shroud head flange 18a; an annular top guide support ring 18c welded to the bottom end of upper shroud wall 18b; a circular cylindrical intermediate shroud wall 18d having a top end welded to top guide support ring 18c; and an annular core plate support ring 18e welded to the bottom end of intermediate shroud wall 18d and to the top end of a lower shroud wall 18f. The diameter of upper shroud wall 18b is greater than the diameter of intermediate wall 18d, and the diameter of intermediate shroud wall 18d is greater than the diameter of lower shroud wall 18f. The entire structure is supported by shroud support 51, which is welded to the bottom of lower shroud wall 18f, and by annular shroud support plate 52, which is welded at its inner diameter to shroud support 51 and at its outer diameter to RPV 10.

The outer circumferential surface of shroud flange 18a has a multiplicity of shroud head bolt lugs (not shown) welded thereto at azimuthal angular intervals. The shroud head 28 is preloaded tightly on top of shroud flange 18a by means of T-head bolts (not shown) which latch under the shroud head bolt lugs. These bolts and lugs oppose the lifting force exerted by the pressurized steam-water mixture inside the shroud, thereby holding the shroud head down. This lifting force is in turn transmitted to the shroud flange 18a via the T-head bolts and shroud head bolt lugs.

Stress corrosion cracking (SCC) is a known phenomenon occurring in reactor components, such as structural members, piping, fasteners, and welds, exposed to high-temperature water. The reactor components are subject to a variety of stresses associated with, e.g., differences in thermal expansion, the operating pressure needed for the containment of the reactor cooling water, and other sources such as residual stress from welding, cold working and other inhomogeneous metal treatments. In addition, water chemistry, welding, heat treatment, and radiation can increase the susceptibility of metal in a component to SCC.

Stress corrosion cracking has been found in the shroud girth welds and heat affected zones thereof. For example, cracks have been found in top guide support ring 18c. These cracks extend radially inwardly from the outer circumferential surface of the top guide support ring and radially outwardly from the inner circumferential surface thereof in the vicinity of the welds which join top guide support ring 18c to shroud walls 18b and 18d.

Stress corrosion cracking in top guide support ring 18c and other heat affected zones of shroud girth welds diminishes the structural integrity of shroud 18, which vertically and horizontally supports core top guide 19 and shroud head 28. In particular, a cracked shroud increases the risks posed by a loss-of-coolant accident (LOCA). During a LOCA, the loss of coolant from the reactor pressure vessel produces a loss of pressure above the shroud head 28 and an increase in pressure inside the shroud, i.e., underneath the shroud head. The result is an increased lifting force on the shroud head and on the upper portions of the shroud to which the shroud head is bolted. If the core shroud has fully cracked girth welds, the lifting forces produced during a LOCA could cause the shroud to separate along the areas of cracking, producing undesirable leaking of reactor coolant. Thus, there is a need for a method and an apparatus for stabilizing a core shroud which has been weakened by SCC to prevent shroud separation as pressure builds in response to a LOCA.

SUMMARY OF THE INVENTION

The present invention is a method and an apparatus for restraining a cracked shroud against vertical joint separation. The method involves the placement of a plurality of tie rods (e.g., four) in the downcomer annulus at respective azimuthal positions, each of the tie rods having one end anchored to the shroud support plate. The other end of each tie rod is latched over the top edge of the shroud to counteract lifting forces exerted on the shroud by the bolts which hold down the shroud head.

Nuclear reactors can be retrofitted in accordance with the method of the present invention by machining holes in the shroud support plate or in a plurality of gusset plates welded thereto. The lower end of each tie rod is then anchored to the shroud support plate by means for coupling with a corresponding hole.

In addition, notches are machined in the shroud head ring of the shroud head. The notches in the shroud head ring are positioned so that they align with the tie rod locations when the shroud head is seated atop the shroud flange.

Each notch at a respective azimuthal position allows an upper support bracket assembly to pass through. The upper support bracket assembly comprises a first portion with a bore having an axis, a second portion with a hooking means and a third portion for rigidly connecting the first portion to the second portion. The first portion is slidably coupled to a threaded portion of the tie rod which has a threaded tensioning nut.

With the hooking means seated on the shroud flange, a tension is applied to the hooking means by tightening the nut on the threaded portion of the tie rod. As the nut travels down the tie rod, it tensions the upper support bracket assembly so that the hooking means holds the shroud flange in a fixed vertical position relative to the shroud support plate, to which the tie rod is anchored.

The amount of preload tension applied to the hooking means is sufficient to prevent looseness and vibratory wear. Use of such relatively low preload avoids inducing significant additional residual stress at locations of weld discontinuities in the shroud, which could accelerate cracking. Significant loads are applied to the tie rods only in the event of a LOCA under shroud conditions where one or more girth welds are fully cracked. In particular, the tie rod assemblies limit separation of a shroud along cracks in the girth welds or heat affected zones thereof in response to lifting pressure on the shroud head.

DETAILED DESCRIPTION OF THE PREFERRED EMBODIMENTS

Figure 1:
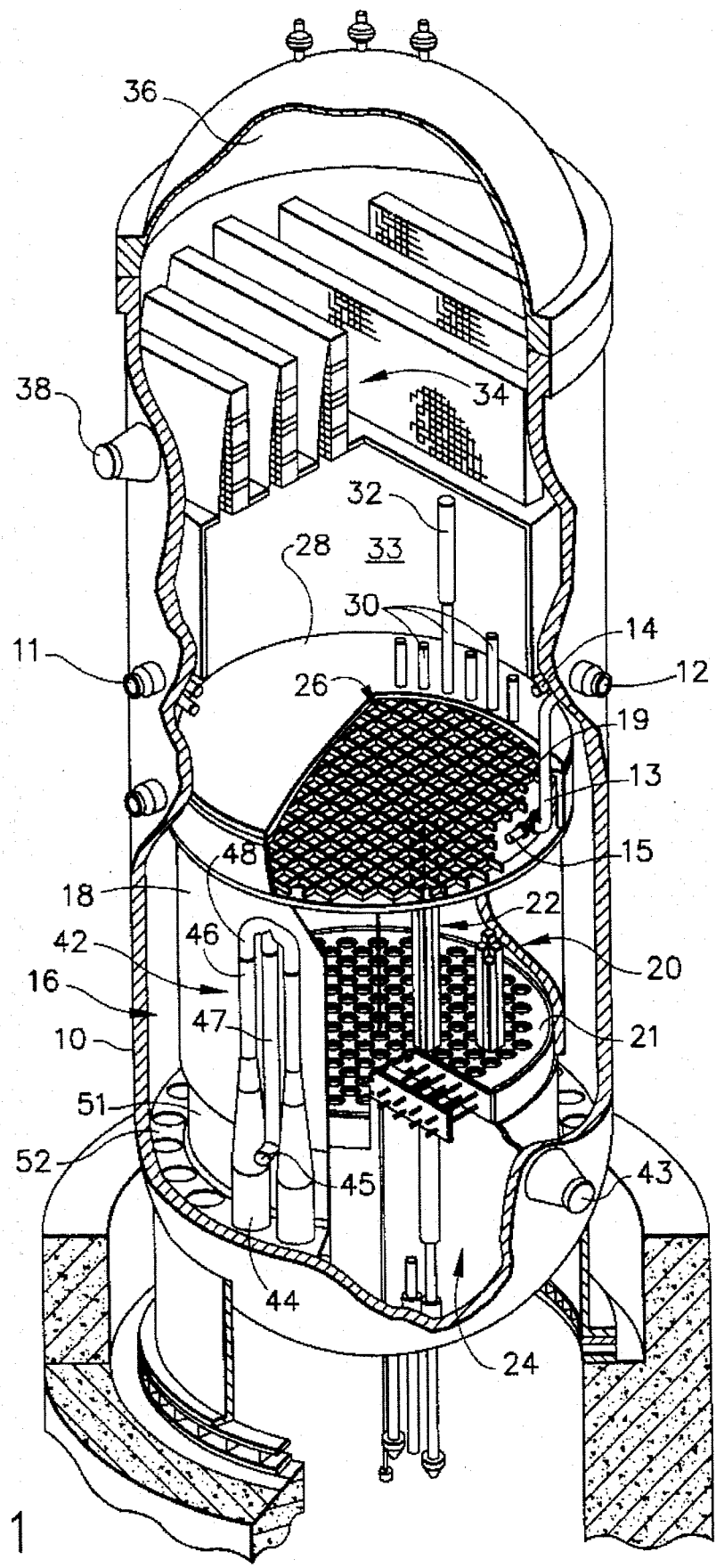
FIG. 1 is a schematic showing a partially cutaway perspective view of a conventional BWR.
Figure 2:
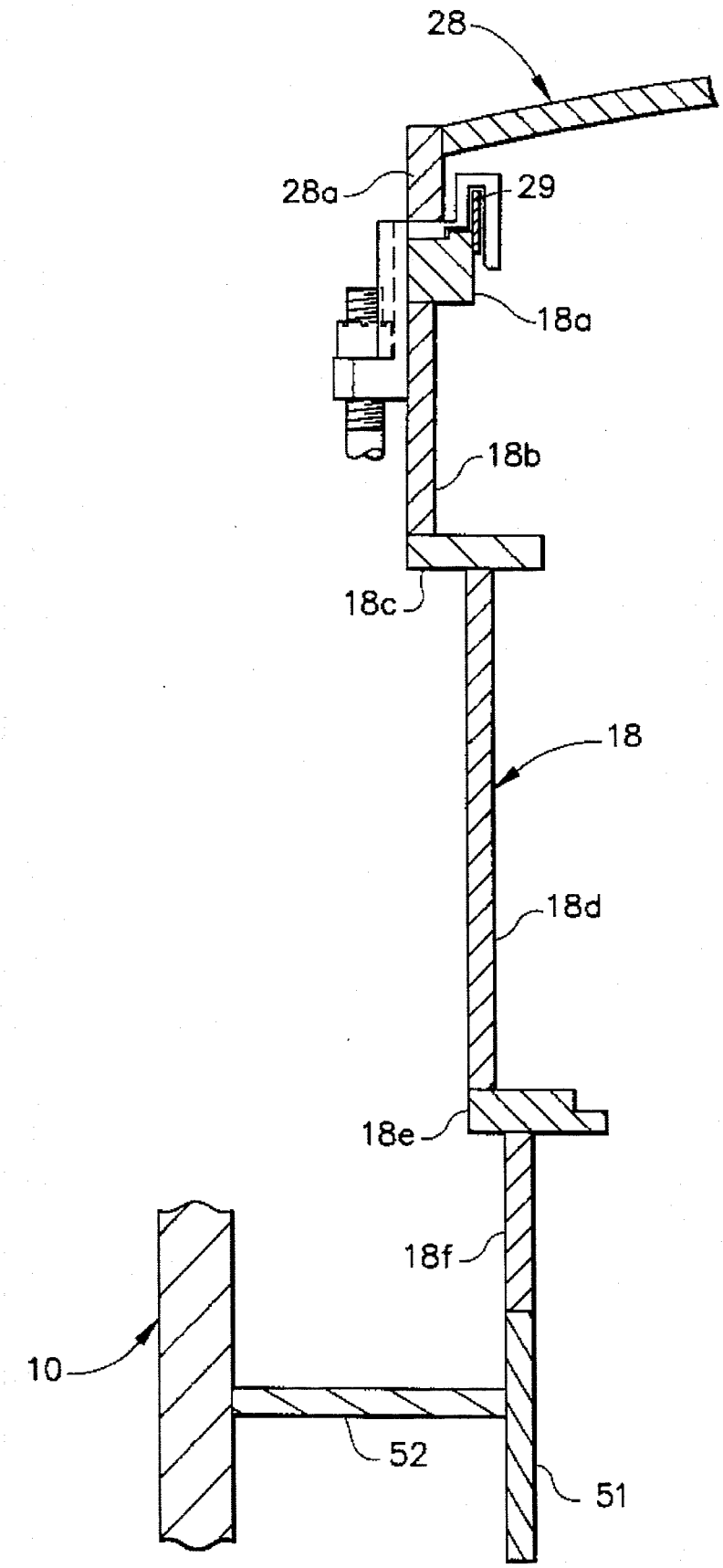
FIG. 2 is a sectional view of a portion of the core shroud of the BWR shown in FIG. 1.
Figure 3A:
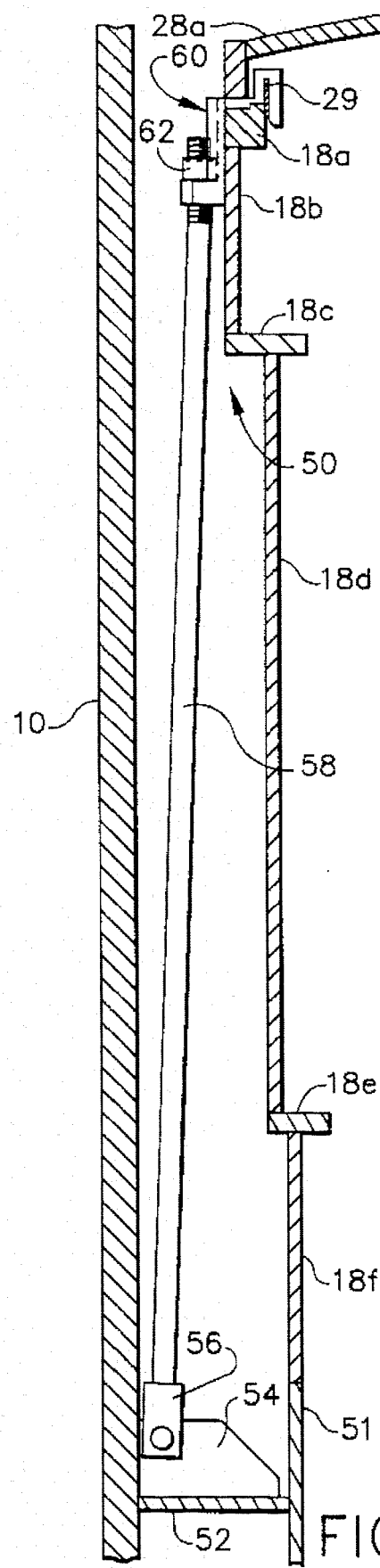
FIG. 3A is a sectional view of a portion of a BWR of the type having gusset plates, showing an installed shroud restraint tie rod in accordance with one preferred embodiment of the present invention.

Referring to FIG. 3A, a shroud restraint tie rod assembly 50 in accordance with a preferred embodiment of the invention comprises a tie rod 58 having a circular cross section. A lower end of tie rod 58 is anchored in a hole machined in a gusset plate 54 by means of a clevis 56. Tie rod 58 extends from the gusset plate 54 to a position adjacent the outer circumferential surface of the shroud flange 18a. The upper end of tie rod 58 has a threaded outer circumferential surface 58a.

Figure 4A:
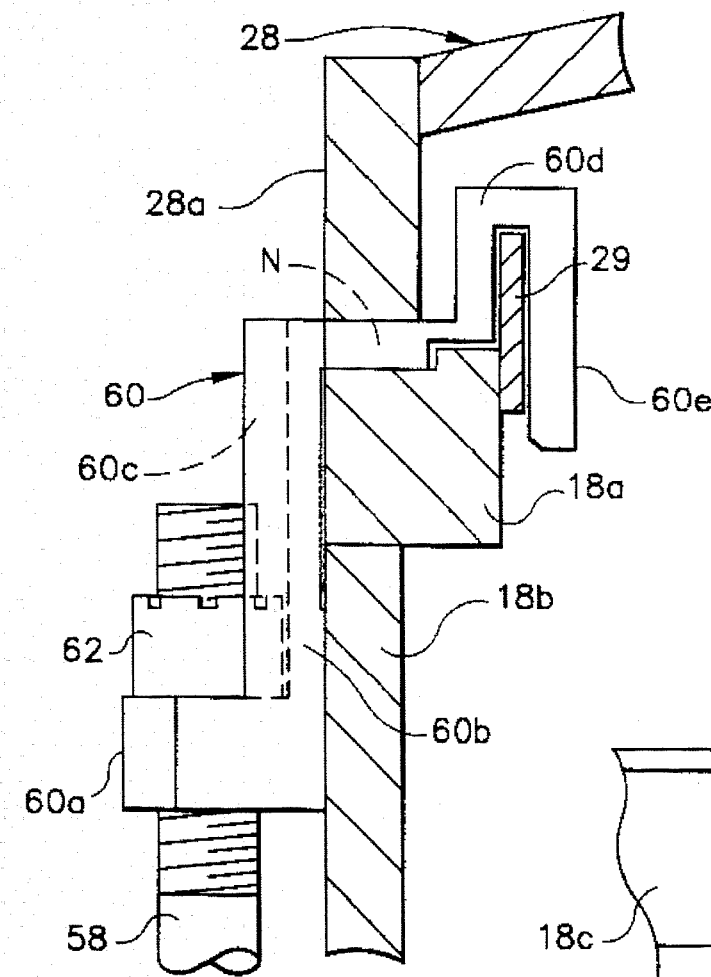
FIG. 4A is a side view of an upper support bracket assembly hooked onto a shroud flange in accordance with the preferred embodiments of the invention.

Referring to FIG. 4A, in accordance with the method of the present invention, a plurality of notches N are machined in the shroud head ring 28a of shroud head 28. The notches N (only one of which appears in FIG. 4A) are positioned so that they align with the upper support bracket when the shroud head 28 is properly seated on the top surface of shroud flange 18a. These notches facilitate the coupling of the tie rod assembly to the shroud flange in accordance with the invention, as described in detail hereinafter. The preferred machining technique is electrical discharge machining, although any other suitable machining technique can be used.

The notch at each tie rod azimuthal position receives a member 60d of an upper support bracket assembly 60. The member 60d conforms to the shape of the top surface of shroud flange 18a and the shape of the steam dam 29. The distal end of member 60d is connected to a vertical member 60e which hooks on the inner circumference of shroud dam 29. Assembly 60 further comprises a coupling 60a having a bore for slidably receiving an upper end of tie rod 58 and a vertical member 60b connected at one end to coupling portion 60a and connected at the other end to horizontal member 60d. Vertical member 60b has a radiused recess 60c, which is a section of a circular cylinder arranged in parallel to the axis of the bore in coupling 60a. Recess 60c receives a portion of the upper end of tie rod 58.

Figure 4B:
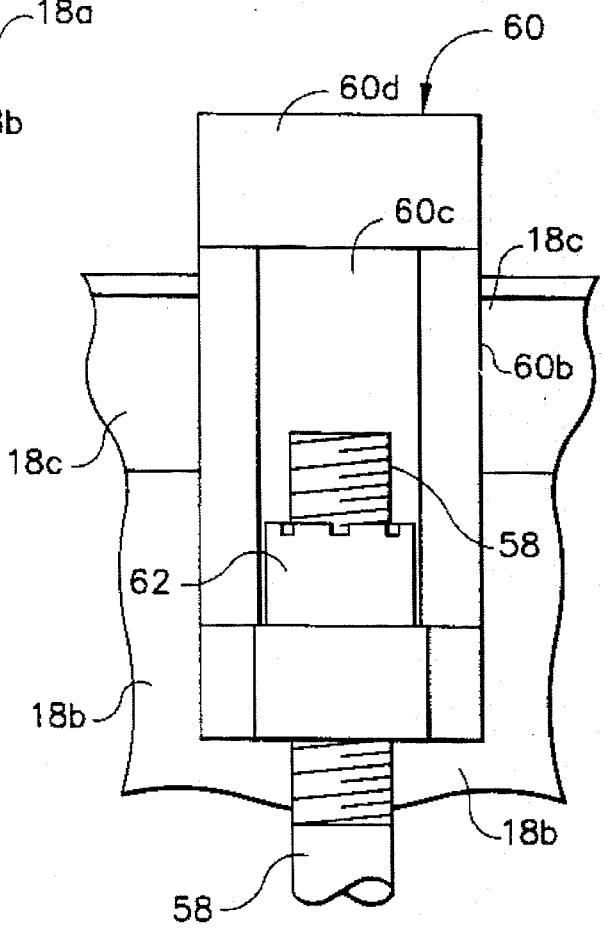
FIGS. 4B and 4C are front and top views respectively of the upper support bracket assembly in accordance with the preferred embodiments of the invention.
Figure 4C:
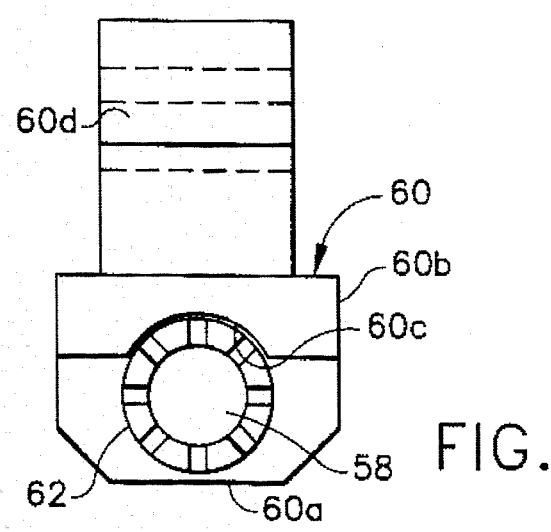

After the upper end of tie rod 58 has been slidably coupled to upper support bracket assembly 60, the threaded portion 58a is threadably coupled to the threaded bore of a castellated nut 62. Nut 62 has a circular outer circumference and an end face with radial slots (best seen in FIG. 4C) for engagement with mating portions of a remotely manipulated tensioning tool (not shown). Recess 60c (see FIG. 4B) allows insertion of the mating portions of the tensioning tool above the castellated end face of nut 62.

After the upper support bracket assembly 60 has been hooked over the shroud flange 18a and steam dam 29, as depicted in FIG. 4A, nut 62 is turned in a clockwise direction by the tensioning tool until the nut is snug. Then an upward tension is applied to the upper end of the tie rod 58 and nut 62 is again tightened. As the nut is tightened, it bears against coupling 60a and tensions assembly 60. In the tensioned state, vertical member 60e blocks radially outwardly displacement of assembly 60, and horizontal member 60d exerts a restraining force on the top surface of the shroud flange 18a. This restraining force counteracts the lifting force exerted on the shroud flange by the shroud head bolts which are coupled to the shroud head bolt lugs (not shown). The nut 62 is secured by a tie rod nut locking collar (not shown) which may be crimped or tackwelded to the tie rod or support bracket 60 in conventional fashion.

Figure 3B:
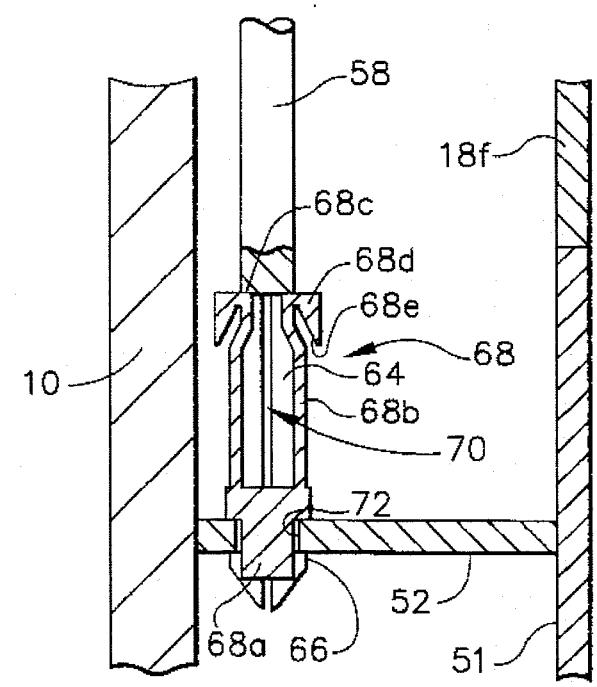
FIGS. 3B and 3C are sectional and side views, respectively, showing an installed shroud restraint tie rod in accordance with another preferred embodiment of the present invention.

In accordance with another preferred embodiment, each tie rod assembly is coupled to a hole 72 machined into the shroud support plate 52, as depicted in FIG. 3B. The upper support bracket assembly 60 remains the same. Instead of a clevis, the lower end of the tie rod 58 has four resilient fingers 64 extending in parallel with an axis of tie rod 58 and arranged in a square array. Each finger 64 has a free distal end with a radially outwardly extending latching projection 66 formed thereon. Each pair of adjacent fingers is separated by a respective planar gap 70. The four gaps 70 are disposed radially at equal angular intervals of 90°. Gaps 70 communicate at the center of the finger array to form a cruciform gap which allows radially inward collapse of the distal ends of the fingers 64. The tip of the finger array is rounded and narrowed to allow easy insertion inside hole 72. When latching projections 66 clear the bottom edge of hole 72, the resilient fingers 64 spring radially outwardly. This action latches the shoulders of latching projections 66 behind the shroud support plate 52, blocking removal of fingers 64 from hole 72.

Figure 3C:
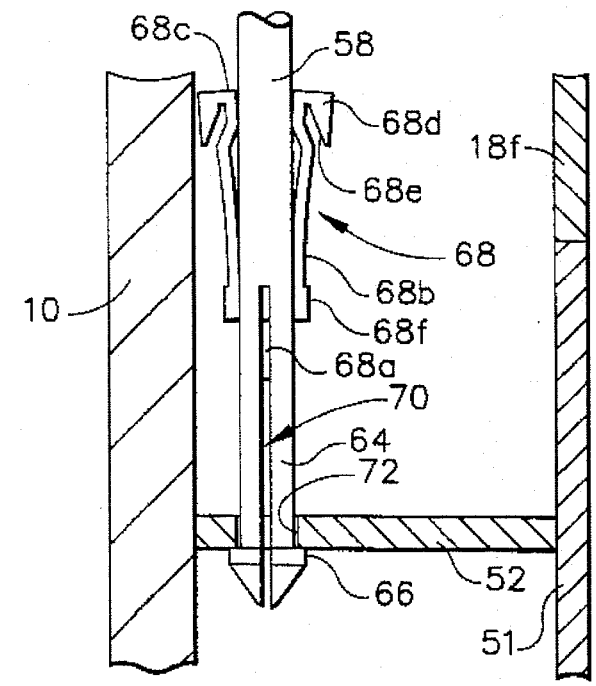
Figure 5:
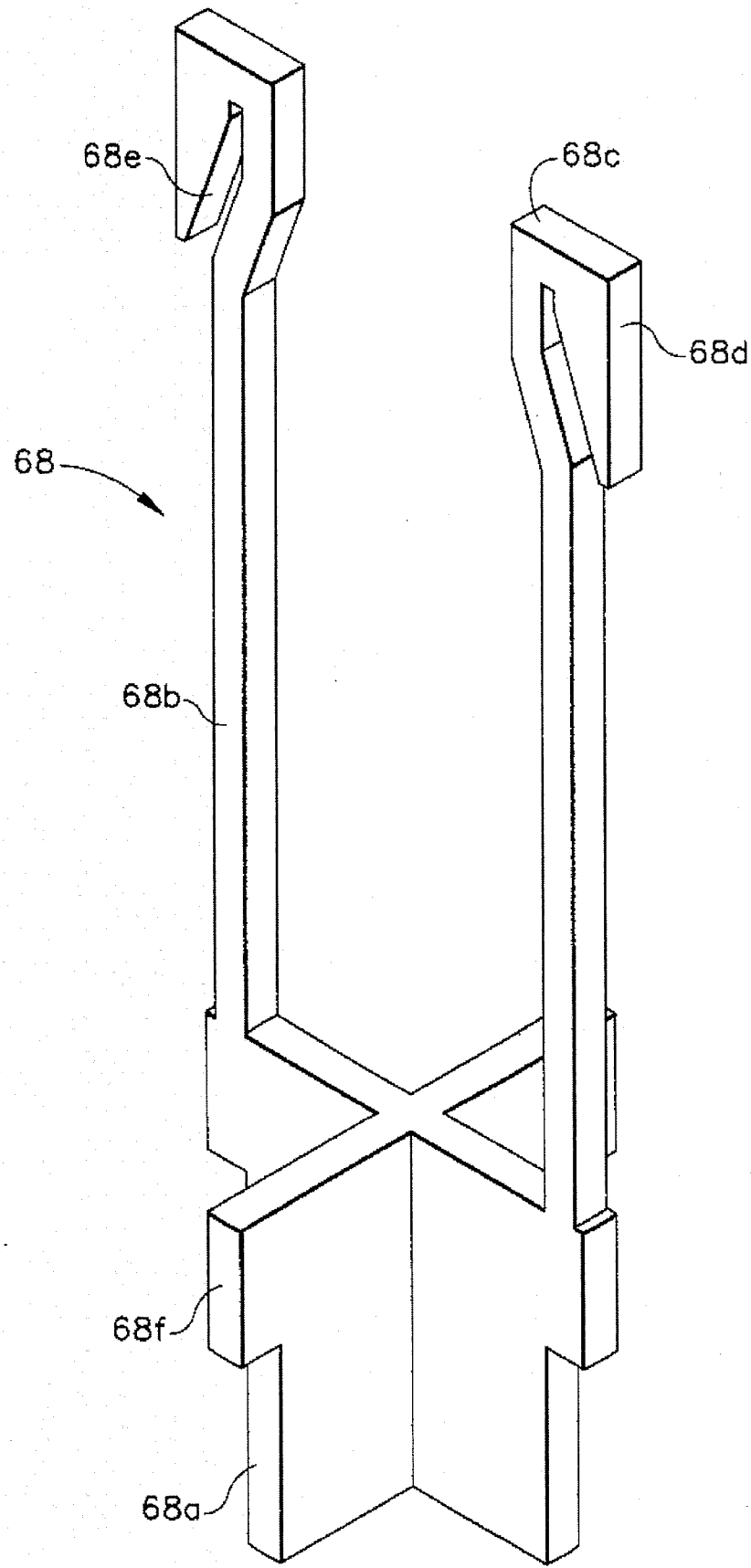
FIG. 5 is a perspective view of the spacer of the preferred embodiment shown in FIGS. 3B and 3C.

A quick disconnect mechanism 68 is designed to enable easy locking and unlocking of the coupling mechanism. As best seen in FIG. 5, mechanism 68 comprises a cruciform spacer 68a having cross members at 90° angles joined at the center. Referring to FIGS. 3B and 3C, when the fingers 64 are not bent radially inward, each cross member fits loosely in a corresponding gap 70 to allow sliding of the spacer along the cruciform gap. When spacer 68a is in its lowermost position (see FIG. 3B), i.e., with ledges 68f in abutment with the shroud support plate 52, the spacer cross members occupying the gaps 70 maintain the fingers in spaced relationship and block radially inward compression thereof, i.e., the coupling mechanism cannot be removed from hole 72. In contrast, when spacer 68a is in its uppermost position (see FIG. 3C), i.e., at the root of the cruciform gap, the spacer cross members do not prevent radially inward compression of the fingers, i.e., the coupling mechanism can be removed from hole 72. Removal is accomplished by remote manipulation of a tool which squeezes fingers 64 together, whereby the latching projections 66 can pass through hole 72.

The disconnect mechanism 68 further comprises a locking device to lock against inadvertent disengagement. This locking device is in the form of a pair of leaf spring lock handles 68b which extend axially from diametrally opposite locations. Each leaf spring lock handle 68b terminates in a generally radial latching surface 68c. When the spacer 68a occupies its uppermost position at the root of the cruciform gap (see FIG. 3C), the leaf springs are flexed radially outwardly from their relaxed state. When the spacer 68a is slid down into its lowermost position with ledges 68f abutting the shroud support plate 52 (see FIG. 3B), the latching surface 68c of each leaf spring lock handle clears the root of the corresponding gap 70 and springs radially inward into that gap. Abutment of the latching surface 68c on the gap root blocks upward displacement of spacer 68a to the disconnect position.

The disconnect mechanism 68 further comprises hooks 68d respectively connected to the ends of leaf spring lock handles 68b. Each hook has a camming surface 68e on a radially inner portion thereof. To unlatch the leaf spring lock handles 68b from corresponding gaps 70, a remotely manipulated tool is engaged under hooks 68d and pulled upward. As the tool displaces upward, it bears against the camming surfaces 68e to cam the leaf spring lock handles radially outward in opposite directions. When the latching surfaces 68c are clear, the spacer 68a is carried upward by the tool. When the spacer occupies its uppermost position, the tool for compressing fingers 64 is used to enable removal of the coupling mechanism from hole 72.

In accordance with the preferred arrangement, four shroud restraint tie rod assemblies are installed at respective azimuthal positions distributed at angular intervals around the shroud circumference. However, the concept of the invention is directed to the installation of two or more tie rod assemblies and is expressly not limited to an arrangement of four.

The preferred embodiments of the shroud restraint tie rods in accordance with the invention have been disclosed for the purpose of illustration. Variations and modifications of the disclosed structure which do not depart from the concept of this invention will be readily apparent to persons skilled in the art of mechanical engineering. All such variations and modifications are intended to be encompassed by the claims set forth hereinafter.

I claim:

1. A mechanism for coupling a member to a circular hole of predetermined diameter in a metal plate, comprising:

a plurality of fingers extending in parallel with an axis and supported at one end only, each finger having a free distal end with a radially outwardly extending latching projection formed thereon and each pair of adjacent fingers being separated by a respective gap, said gaps communicating to form a cruciform gap which allows flexing of said distal ends of said fingers to close the gap between distal ends of adjacent fingers, said latching projections being passable through the circular hole when said fingers are flexed toward each other and being not passable through the circular hole when said fingers are not flexed toward each other; and a cruciform spacer slidably seated in said cruciform gap, said spacer being slidable along said axis between first and second positions, whereby flexing of said fingers toward one another is blocked when said spacer is in said first position and flexing of said fingers toward one another is not blocked when said spacer is in said second position.

2. The mechanism as defined in claim 1, wherein the distal end of each of said fingers has a camming surface disposed so that said fingers are flexed toward each other when said distal ends are pressed into the circular hole.

3. The mechanism as defined in claim 1, wherein said fingers are integrally formed with said member.

4. The mechanism as defined in claim 3, wherein said member is a rod.

5. The mechanism as defined in claim 1, further comprising first and second leaf springs connected to said cruciform spacer, said leaf springs each comprising latching portions which seat in said cruciform gap to lock said spacer in said first position.

6. The mechanism as defined in claim 5, further comprising first and second hooks connected to the latching portions of said first and second leaf springs respectively, each hook having a camming surface disposed so that the application thereon of a predetermined axial force forces the latching portions to positions whereat the spacer is not locked in said first position.

7. A mechanism for coupling a member to a circular hole of predetermined diameter in a metal plate, comprising:

a plurality of fingers extending in parallel with an axis and supported at one end only, each finger having a free distal end with a radially outwardly extending latching projection formed thereon and each pair of adjacent fingers being separated by a respective one of a plurality of radial gaps which allow flexing of said distal ends of said fingers toward said axis, said latching projections being passable through the circular hole when said fingers are flexed toward said axis and being not passable through the circular hole when said fingers are not flexed toward said axis; and a spacer which is axially slidable between first and second positions, said spacer comprising a member which fits in a first radial gap between first and second fingers of said plurality of fingers, whereby flexing of said first and second fingers toward said axis is blocked when said spacer is in said first position and flexing of said first and second fingers toward said axis is not blocked when said spacer is in said second position.

8. The mechanism as defined in claim 7, wherein the number of radial gaps equals four.

9. The mechanism as defined in claim 8, wherein said radial gaps are spaced at 90-degree intervals.

10. The mechanism as defined in claim 7, wherein said spacer has a cruciform cross section.

11. The mechanism as defined in claim 7, further comprising first and second leaf springs connected to said spacer, said leaf springs each comprising latching portions which seat in respective radial gaps to lock said spacer in said first position.

12. The mechanism as defined in claim 11, further comprising first and second hooks connected to the latching portions of said first and second leaf springs respectively, each hook having a camming surface disposed so that the application thereon of a predetermined axial force forces the latching portions to positions whereat the spacer is not locked in said first position.

* * * * *